May 11, 1948.  E. H. SCHENK  2,441,211
AIRCRAFT CONTROL LEVER
Filed Nov. 7, 1944  3 Sheets-Sheet 1
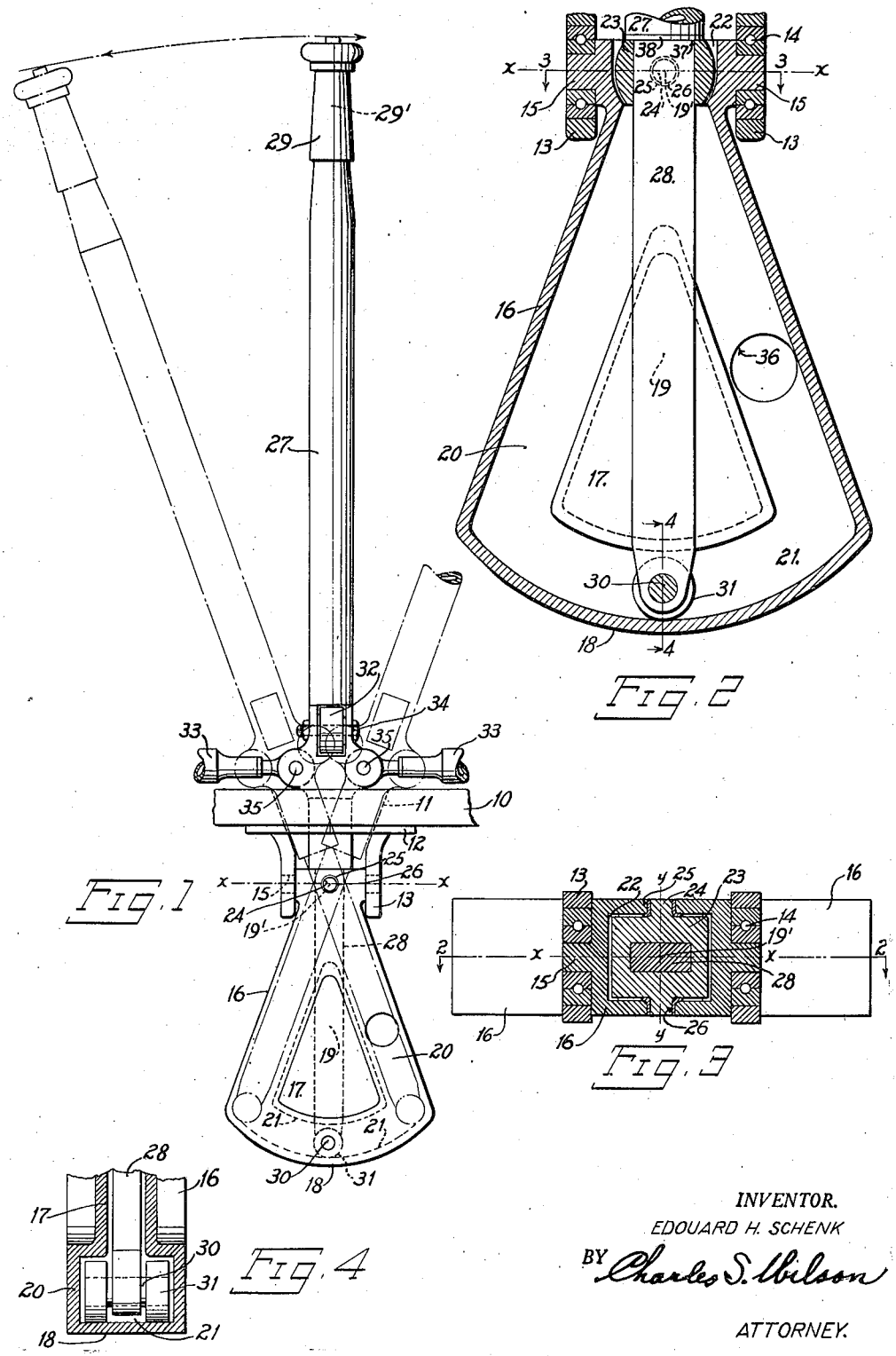
INVENTOR.
EDOUARD H. SCHENK
BY Charles S. Wilson
ATTORNEY.

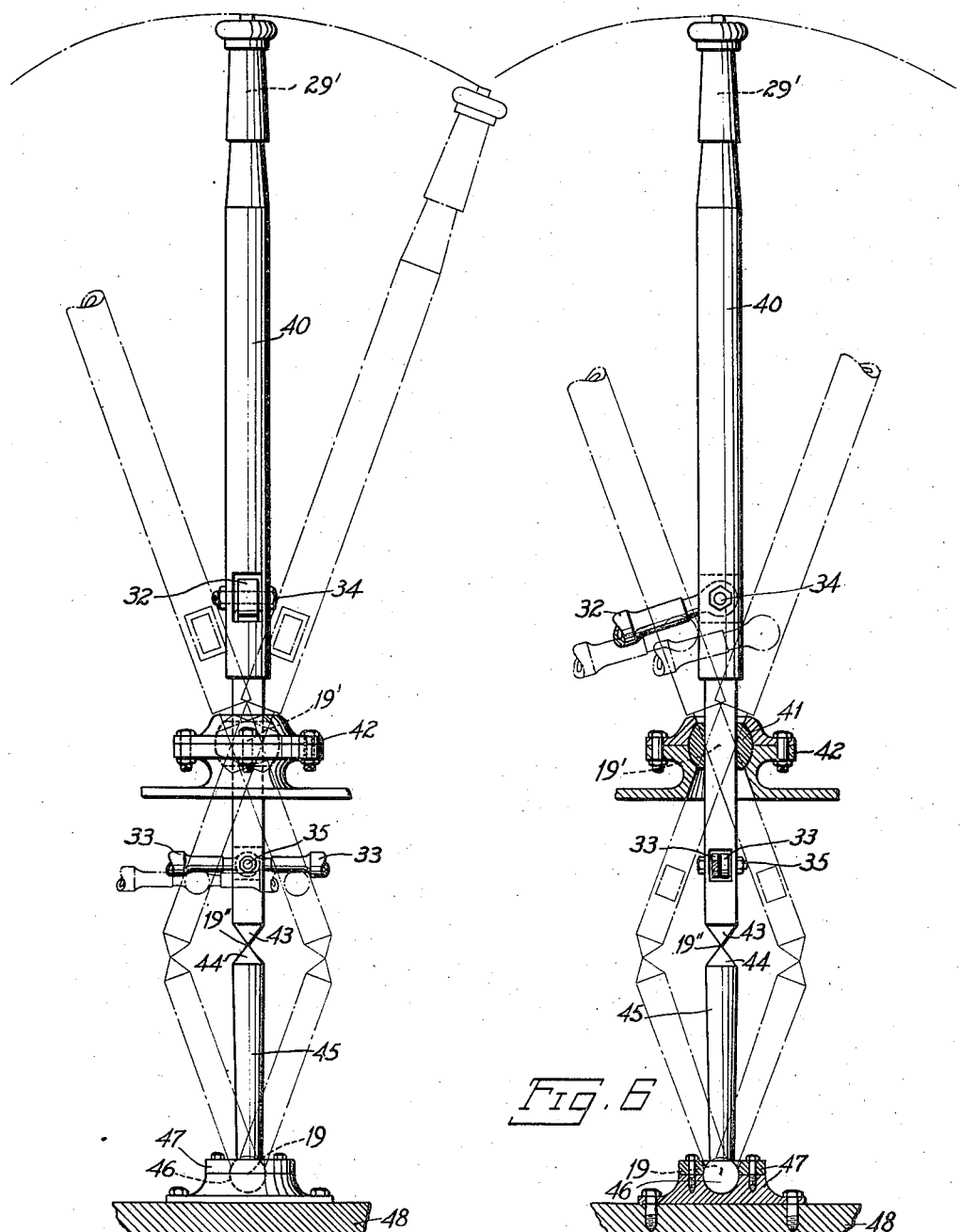

May 11, 1948.  E. H. SCHENK  2,441,211
AIRCRAFT CONTROL LEVER
Filed Nov. 7, 1944  3 Sheets-Sheet 3

INVENTOR.
EDOUARD H. SCHENK
BY Charles S. Wilson,
ATTORNEY.

Patented May 11, 1948

2,441,211

UNITED STATES PATENT OFFICE 2,441,211

AIRCRAFT CONTROL LEVER

Edouard H. Schenk, New York, N. Y., assignor to Republic Aviation Corporation, Farmingdale, N. Y., a corporation of Delaware Application November 7, 1944, Serial No. 562,278

10 Claims. (Cl. 74—516)

This invention relates to aircraft controls generally and more particularly to the pilot operated airfoil controls mounted in the cockpit of an aircraft and proposes a control having an automatically effective variable leverage or mechanical advantage.

More particularly, the instant invention contemplates an organization of a pilot operated control member (stick, column or pedal) and of the parts directly connected thereto capable of giving to the aircraft control a variable leverage that will be greatest in neutral position of said member and inversely proportional to the angle of throw in all other operative positions of said member, achieving said variable leverage entirely automatically, i. e. without recourse to any of the special adjustments of parts or additional pilot manipulations to accomplish a differential motion of a controlled airfoil.

With the above and other objects in view, as will be apparent, this invention consists in the construction, combination and arrangement of parts, all as hereinafter more fully described, claimed and illustrated in the accompanying drawings, wherein:

Fig. 1 is a more or less schematic front elevation of a control stick of an aircraft and associated parts embodying the present invention to vary the leverage of said stick for the aileron control and illustrates in phantom lines the transversal throw of the stick to control the ailerons of the aircraft;

Fig. 2 is an enlarged transversal axial section along line 2—2 of Fig. 3;

Fig. 3 is an enlarged horizontal section made along line 3—3 of Fig. 2 through the fulcrum of the stick;

Fig. 4 is a partial vertical axial section along line 4—4 of Fig. 2;

Fig. 5 is a skeletal front elevation of a modification of the present invention in which the variable leverage is effective for controlling both the elevators and the ailerons of an aircraft and illustrates in phantom lines the transversal throw of the stick to control the ailerons of the aircraft;

Fig. 6 is a skeletal side elevation of that form of the invention disclosed in Fig. 5 with part in axial section, illustrating in phantom lines the longitudinal throw of the stick controlling the elevators of the aircraft;

Figure 7:
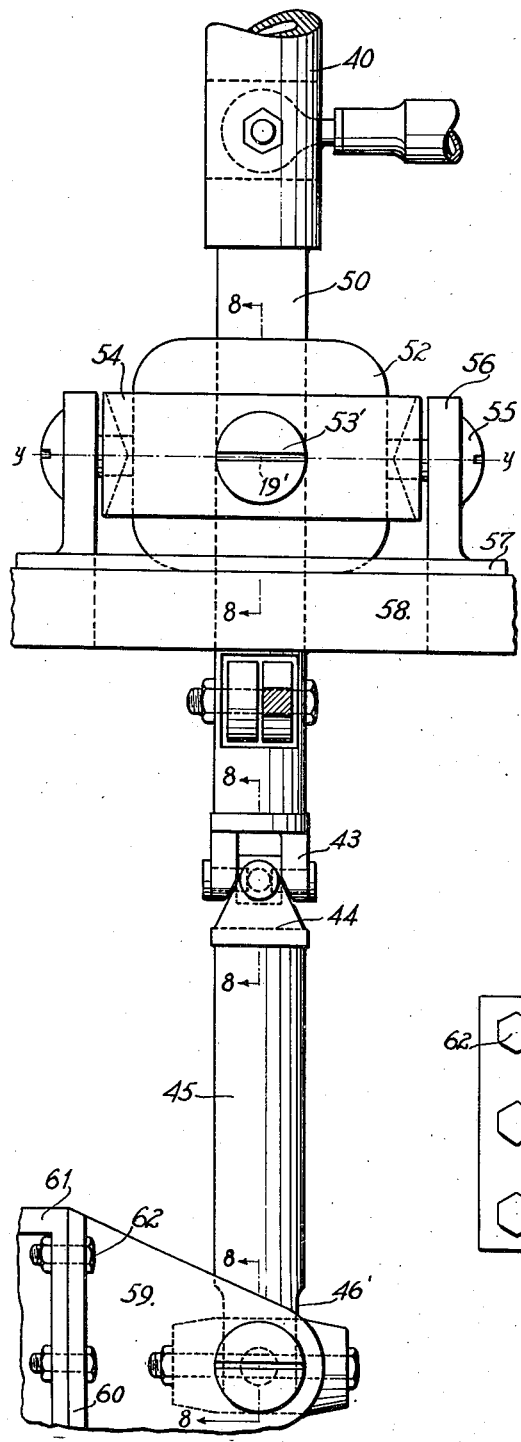
Fig. 7 is a partial side elevation of the lower part of a stick of the type illustrated in Figs. 5 and 6 showing a modification of structural details.

Various aircraft control systems have been proposed or designed with the object of allowing the pilot to vary the leverage or mechanical advantage applied through a lever or control to the airfoils of the aircraft, to the end that the resistance of the airfoils to adjustment at high speeds may be overcome.

In all of these known differential systems, the effective length of only one of the arms of the control lever can be varied at one time, while the differential device of this invention allows for varying automatically and simultaneously the effective lengths of both the power arm and the work arm of the control lever, thus permitting a much broader range of adjustment for the desired variation of leverage or mechanical advantage.

Essentially the present invention consists in providing an aircraft control mechanism with a control lever mounted to slide with respect to its fulcrum thus automatically varying the relative effective length of its work and power arms to produce a different leverage or mechanical advantage in each position of the control lever with respect to its fulcrum. The instant invention also proposes controlling this sliding motion concomitantly with the angular motion of the lever about its fulcrum.

While the present invention, as preferably applied to the stick or control column of an aircraft, operates with equal facility for the differential control and operation of any movable airfoil of the aircraft, either by being embodied in said stick or column constituting a primary control lever or in a secondary lever, it is shown in the drawings, for illustrative purposes, in conjunction with the joint control of the ailerons and of the elevators of an aircraft by means of the conventional control stick or lever.

In that embodiment of the invention, shown more or less schematically in Figs. 1 to 4, inc., 10 indicates the floor of the cockpit of any conventional aircraft. Directly under a frusto-conical opening 11 in said floor is fastened thereto a bifurcated bracket 12 made in two parts for convenience of assembly, in the separable ears 13 of which are pivoted—through the intermediary of ball bearings 14—the opposed trunnions 15 of a more or less triangular cradle 16. The horizontal axis $x-x$ of said trunnions is perpendicular or transverse to the longitudinal axis of the aircraft in order that the cradle 16 be suspended from the floor 10 and pivoted for fore-and-aft oscillation with respect to the aircraft. This cradle 16 forms a hollow flat box having a narrower central portion 17, an arched or arcuate bottom 18 curved about a center 19 distinct and spaced from the fulcrum 19' of the control lever 27—28 on the axis $x$—$x$ and a wider border portion 20 forming a continuous U-channel 21 of rectangular section as clearly shown in Fig. 4. Near the apex of the cradle 16 its two sides of this U-channel converge and coextend so as to form a central opening or socket 22 of rectangular horizontal section. In this socket 22 is pivotally mounted a tubular guide 23 also of rectangular horizontal section, having a pair of opposed trunnions 24 fitting in corresponding bushings 25 mounted in openings 26 in the neck of the cradle. The horizontal axis $y$—$y$ of said trunnions 24 intersects the axis $x$—$x$ of the trunnions 15 at the point 19', in order that the tubular guide 23 be thus pivoted to the cradle for transverse oscillation with respect of the aircraft.

Thus assembled and arranged, the cradle 16 and the guide 23 form a universal mounting having a fixed point or fulcrum 19' for a control stick 27 which has rectangular or flattened lower portion 28 slidably mounted in a rectangular opening of the guide 23. All of the flat surfaces of the portion 28 of the control lever 27, as well as the corresponding flat surfaces of the rectangular opening of the guide 23 are highly polished to facilitate the sliding movement of the stick 27 as a unit. This stick is provided at its upper extremity with the conventional grip or handle 29 and projects below its fulcrum 19' within the cradle 16, its lower extremity carrying a transverse shaft 30 on which are pivotally mounted a pair of rollers 31 engaged into the U-channel 21 on each side of the stick, so as to cooperate with the inner face of the arcuate bottom 18 which acts as a track.

A conventional elevator push-pull rod 32 and a pair of opposed conventional aileron push-pull rods 33 are suitably attached to pivot-bolts 34 and 35 respectively, transversely mounted at right angles to each other at any desired points along the stick 27. Obviously, if it is desired to attach any of these rods to the stick below the fixed fulcrum 19', corresponding openings will be provided in the walls of the cradle 16 for the passage of required rod or rods.

As will be well understood by those skilled in the art, each of said rods 32—33 is connected to the controlled airfoil by any conventional or other linkage or cable system capable of coacting with the present control. Since such system forms no part of this invention it is neither shown nor described.

The reduced lower portion 28 of the control lever 27 is separated from the upper portion of the lever by a shoulder 37 which, when the lever 27 is in its vertical or neutral position, rests upon the guide 23 while the rollers 31 carried by the lever are situated at the low point of the arcuate bottom 18 of the cradle 16 that functions as a track for said rollers. Shims 38 may, if desired, be interposed between the shoulder 37 and the guide 23 to regulate the traction of the rollers 31 on the track 18 by relieving the frictional contact between the rollers and the track.

A series of lightening holes 36 may be provided in the sides of the channel 21 and can be aligned in pairs transversely of said channel. To assist in the assembly of the lever 27—28, the cradle 16 and the rollers 31, these openings may have a diameter somewhat greater than the diameter of rollers to the end that the rollers 31 and their shaft 30 may be inserted into the channel and assembled with extremity of the reduced portion 28 of the lever.

When the pilot operates the lever 27—28 in a fore-and-aft direction to adjust the elevators through the rod 32, the lever 27—28 and the guide 23 swing in unison with the cradle 16 about the transversal axis $x$—$x$ without movement of the lever 27—28 in the guide 23, i. e. without changing the effective length of either the power arm or the work arm of the lever, the quotient or ratio of which determines the leverage or mechanical advantage of said control lever. The leverage developed by the lever 27—28 under this operation thus remains constant and independent of the amplitude of these fore-and-aft oscillations so that the differential device of this invention may be said to be totally ineffective on the control of the elevators. But when the pilot swings the lever 27—28 laterally or in a transverse direction to adjust the ailerons through the rods 33, the cradle 16 remains stationary in its vertical neutral position and the lever 27—28 swings therein in unison with the guide 23 about the longitudinal axis $y$—$y$. As the track 18 is not coaxial with the axis $y$—$y$—i. e., its center 19 is distinct and spaced from the center 19' of the axis $x$—$x$—the stick is bodily lifted and slides axially in the guide 23 during this spanwise or transverse oscillation by virtue of the coaction of the track and the lower end of the lever, the track acting then as an inclined plane under the rollers 31.

It is manifest that the power arm of the lever 27—28 is the distance between the axis $y$—$y$ (the fulcrum of the lever) and the grip 29' and that the work arm of this lever is the distance between the axis $y$—$y$ and the approximate centers of the bolts 35 attaching the rods 33 to the lever. Thus as the lever 27—28 is slid in the guide 23 under control of the track 18 during transverse or spanwise oscillation of the lever an increment is added to the respective lengths of the aforesaid power and work arms of the lever which is always proportional to amplitude or degree of oscillation. Therefore in this form of the invention (Figs. 1 to 4, inc.) while the length of the power arm is increased so also is the length of the work arm increased but in greater proportion. This results in a decreasing mechanical advantage as the lever 27—28 moves out of its neutral position to approach the limit of its lateral or spanwise movement in either direction.

When the pilot moves the lever 27—28 in a composite oblique direction to adjust simultaneously the ailerons and the elevators, the leverage of the lever for the operation of both the elevators and the ailerons will be greatest at the neutral position of the lever and will decrease simultaneously when and as it moves away from neutral, but in this case—instead of being directly proportional to the angle of this oblique throw of the stick—the decrease in leverage is directly proportional to the transverse component of this oblique throw.

It must be noted that during either of these two operations of the lever 27—28, there will be a relatively small vertical component of the manual force applied by the pilot, which will tend to keep the rollers 31 in constant rolling engagement with the inner surfaces of the track 18.

In the event of inverted flight the normal top of the channel 21, viz: that portion of the channel opposed to the track 18 functions as the track for cooperation with the rollers 31.

In the modified form of the invention shown schematically in Figs. 5 and 6, control lever 40 is universally and slidably mounted in a ball and socket joint 41—42 having a center 19' and fastened to the floor of the cockpit. The lower end 43 of the lever 40 is universally jointed to the upper end 44 of an anchoring or guiding link 45 which in turn is universally mounted by the ball and socket joint 46—47 on a fixed structure 48 forming a part of the fuselage below the floor of the cockpit.

In neutral position, the lever 40 and the link 45 are coextensive and the centers 19', 19'' and 19 respectively of the three universal joints 41—42, 43—44 and 46—47 are aligned on the longitudinal axes of the lever 40 and of the link 45. As the pilot moves the lever away from its neutral position in any direction, the center 19'' of the intermediary universal joint 43—44 moves on a curve concentric to the center 19 of the universal joint 46—47 out of the aforesaid alignment thereby causing the link 45 to pull the lever 40 downwardly in the ball 41 and relative to its fixed fulcrum 19' at the center of the universal joint 41—42.

In this form of the invention the elevator rod 32 is attached to the lever 40, as at 34, above the fixed fulcrum 19', while the rods 33 for the control of the ailerons are attached to the lever 40 below its fulcrum 19'.

It becomes apparent from this that for the control of the elevator the power arm of the lever 40 is the distance between the grip 29' and the center 19' and the work arm is the distance between the center 19' and the axis of the bolt 34: while for the control of the ailerons the power arm is the distance between the grip 29' and the axis of the bolt 35.

Thus, when the lever 40 is moved away from or out of neutral, its work arm for the control of the ailerons increases and the work arm for the control of the elevators decreases, while the power arm common for both the ailerons and the elevators, simultaneously decreases, these increases and decreases being equal and directly proportional to the angle or amplitude of throw of the lever. From these changes or variations in the effective lengths of the arms of the lever 40 results a reduction of the mechanical advantage or leverage for the operation of the ailerons and an increase in leverage or mechanical advantage for the operation of the elevators.

Figure 8:
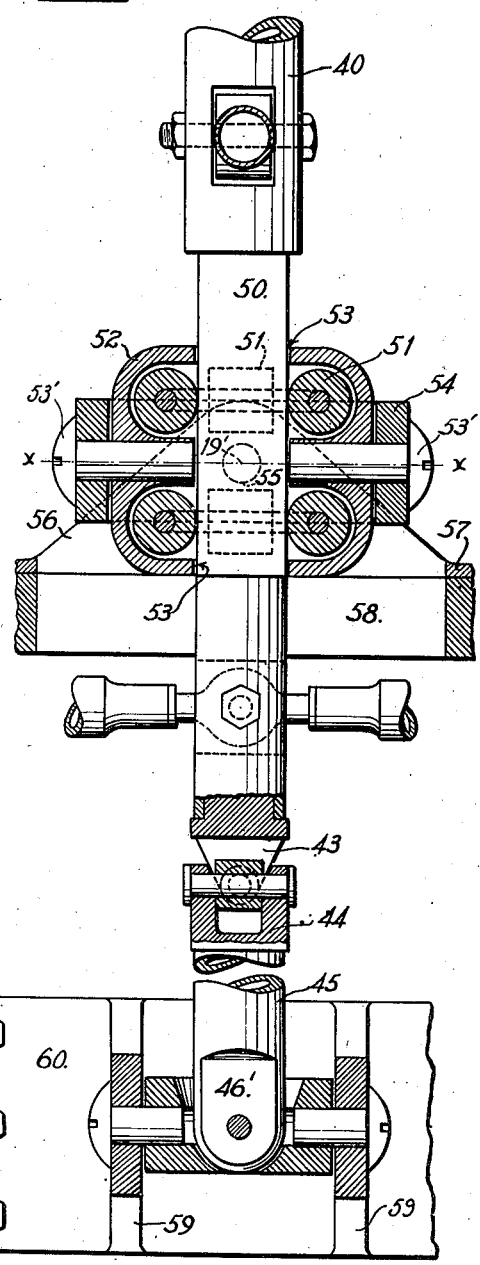
Fig. 8 is a partial front elevation, with parts in axial transversal section along lines 8—8 of Fig. 7.

In Figs. 7 and 8 is illustrated, in more detail and at a larger scale, a further modification of this invention, especially of the form shown in Figs. 5 and 6, in which the ball and socket joints 41—42, 43—44 and 46—47 in Figs. 5 and 6 are replaced by universal joints of the Hooke type.

In this modification, the lever 40 medially of its length is squared or rectangular in section, as at 50, to coact with a series of rollers 51 mounted, as shown in Fig. 8, in a housing 52, the upper and lower walls of which are provided with vertically aligned openings 53 for the reciprocable passage of the medial portion 50 of the lever. This housing 52 is trunnioned by means of two aligned, opposed studs 53' to a frame 54, which in turn is trunnioned by means of two aligned, opposed studs 55 to the flanges 56 of a bracket 57 secured on the floor 58 of the cockpit; the axes x—x and y—y of these trunnions being at right angle and intersecting each other at the point 19' forming the fixed fulcrum of the lever 40—50 and the center of the housing 52.

Any suitable kind of Hooke universal joint may be used to connect universally the bifurcated lower extremity 43 of the lever 40 to the forked upper extremity 44 of the anchoring or guiding link 45 and to connect the lower extremity 46' of said link to the flanges 59 of a bracket 60 secured to the fuselage cross tie 61 by means of bolts 62.

While only two forms of the present invention have been shown and described in detail, it will be understood that the invention is not limited to the arrangements and details shown in these drawings, for various modifications, substitutions of equivalents and changes in application and details of construction may be made without departing from the spirit and scope hereof.

What is claimed is:

1. In an aircraft including a fixed structure, a control lever mounted for universal movement on said structure, and means for automatically and simultaneously varying the lengths of the power and the work arms of said lever upon and in response to the universal movement thereof.

2. An aircraft control comprising a tubular mount having universal movement about fixed pivots the axes of which intersect at its center, a control lever axially slidable in said mount for oscillation in all directions in unison with the mount, and means, responsive to the oscillations of the lever, to slide the lever within said mount so as to vary its effective leverage.

3. In an aircraft control the combination with a fixed structure, of a tubular mount carried by said fixed structure for universal movement, a control lever free to slide in said tubular mount, and supporting means coacting with one of the extremities of said lever to vary its position relative to the mount upon its oscillation with said mount.

4. The combination with a fixed aircraft structure, of a tubular mount suported for oscillation in all directions about a fixed point on said structure, a control lever bodily slidable in said mount and fulcrumed at said fixed point for oscillation in unison with said mount, and a support coacting with the lower extremity of said lever upon its oscillation about said fixed fulcrum to slide said lever in said mount.

5. The combination with a fixed aircraft structure, of a differential airfoil control comprising a tubular mount carried for universal movement by said structure, a control lever having a substantially vertical neutral position and free to slide axially in said mount, a connection to a movable airfoil pivoted to said lever between the mount and the point of application of power to the lever, and a support pivoted to said fixed structure and operatively connected to the lower end of the control lever to slide said lever downwardly in the mount upon movement away from neutral thereby simultaneously shortening both power and work arms and reversely slide said lever upwardly in the mount upon movement toward neutral thereby lengthening simultaneously both power and work arms.

6. The combination with a fixed aircraft structure, of a tubular mount carried for universal movement by said structure, a control lever, having a substantially vertical neutral position, free to slide axially in said tubular mount, a connection to a movable airfoil pivoted to said lever between the mount and the point of application of power to the lever, and a supporting means pivoted for universal movement to said structure and connected by a universal joint to the lower end of said lever to automatically slide said lever downwardly in the mount upon its operation away from neutral to simultaneously shorten both its power and work arms and reversely slide said lever upwardly in the mount upon its operation toward neutral to simultaneously lengthen both its power and work arms.

7. The combination with a fixed aircraft structure, of a tubular mount carried for universal movement by said structure, a control lever having a substantially vertical neutral position, free to slide axially in said tubular mount, a connection to a movable airfoil pivoted to said lever between the mount and the lower end of the lever, and supporting means pivoted for universal movement to said structure and connected by a universal joint to the lower end of said lever to automatically slide said lever downward in the mount upon its operation away from its neutral position to shorten its power arm and simultaneously lengthen its work arm and reversely slide said lever upward in the mount to lengthen its power arm and simultaneously shorten its work arm upon operation of the lever toward its neutral position.

8. The combination with a fixed aircraft structure, of a cradle pivotally mounted on said fixed structure for fore-and-aft oscillation about a horizontal fixed axis transverse to the longitudinal axis of the aircraft structure, a tubular guide pivotally mounted in said cradle for oscillation about an axis transverse to and intersecting said fixed axis, a control lever axially and bodily slidable in said guide to be universally pivoted and fulcrumed about the point of intersection of said two axes, and means carried by said cradle to support and guide the lower end of said lever along an arcuate path eccentric to the pivotal axis of the tubular guide aforesaid.

9. The combination with a fixed aircraft structure, of a spherical socket secured to said structure, a tubular ball universally mounted in said socket, a control lever bodily slidable in said ball and universally pivoted and fulcrumed thereby for oscillating movement from and to a neutral vertical position, an anchoring and supporting link vertically aligned with said lever in the neutral position thereof and universally pivoted to said fixed structure to support and guide the lower end of said lever along an arcuate path located in the periphery of a sphere concentric with the pivot of said link, and a universal joint between said lower end of the lever and the upper end of said link.

10. The combination with a fixed aircraft structure, of a mount carried for universal movement by the structure, rollers situated in said mount to form and surround a square guiding aperture therethrough, a control lever having an intermediate portion of square section axially slidable in said guiding aperture and universally pivoted and fulcrumed about a fixed center by said mount for oscillations to and from a neutral vertical position, an anchoring link vertically aligned with said lever in its neutral position and universally pivoted to said fixed structure to support and guide the lower end of said lever along an arcuate path located in the periphery of a sphere concentric to the pivotal center of said link, and a universal joint between said lower end of the lever and the upper end of said link.

EDOUARD H. SCHENK.

REFERENCES CITED

The following references are of record in the file of this patent:

UNITED STATES PATENTS

| Number | Name | Date |
| --- | --- | --- |
| 1,904,151 | Leyes | Apr. 18, 1933 |
| 965,081 | Chase | July 19, 1910 |
| 213,079 | Wadsworth | Mar. 11, 1879 |
| 1,808,342 | Chilton | June 2, 1931 |
| 2,371,596 | Amery | Mar. 20, 1945 |

FOREIGN PATENTS

| Number | Country | Date |
| --- | --- | --- |
| 2,486 | Great Britain | Jan. 31, 1907 |
| 79,256 | Austria | Dec. 10, 1919 |